June 6, 1967  W. C. SCHUMACHER  3,324,260
SWITCHED OUTLET ADAPTER
Filed Oct. 1, 1965  2 Sheets-Sheet 1

INVENTOR.
WALTER C. SCHUMACHER
BY Paul E. Rochford
ATTORNEY

June 6, 1967  W. C. SCHUMACHER  3,324,260
SWITCHED OUTLET ADAPTER
Filed Oct. 1, 1965  2 Sheets-Sheet 2
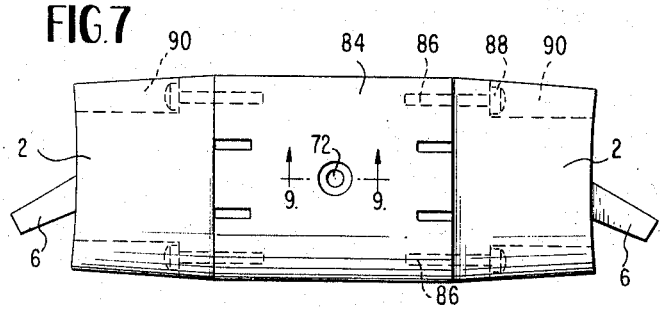
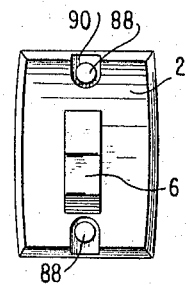
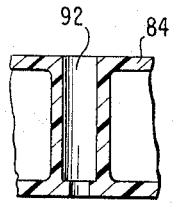
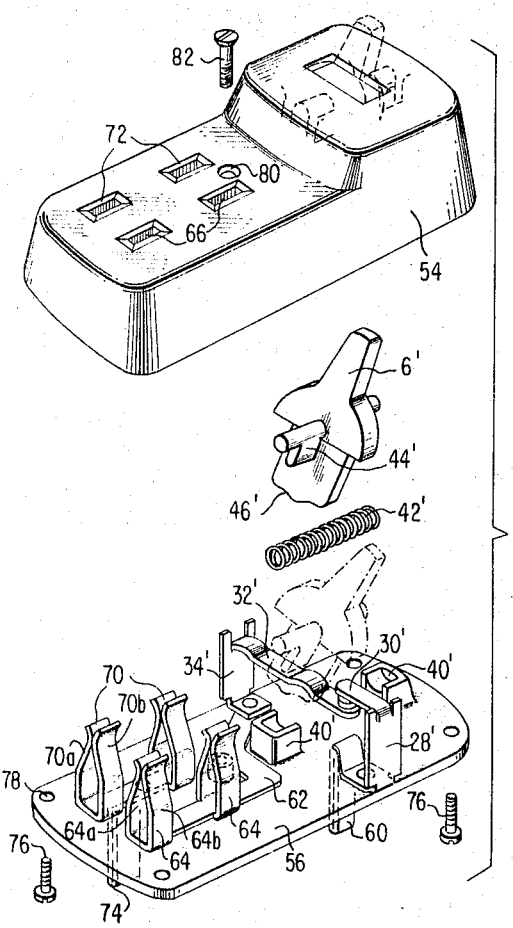
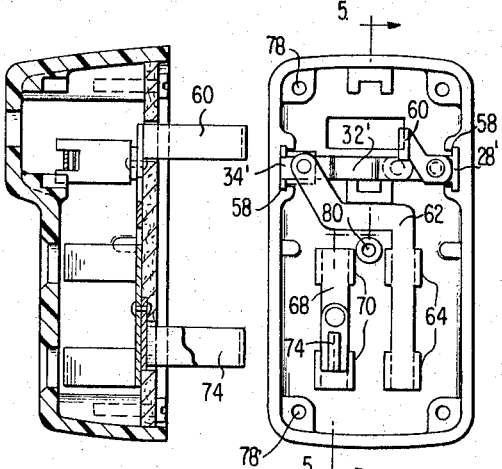
INVENTOR
WALTER C. SCHUMACHER
BY Paul E. Rochford
ATTORNEY

United States Patent Office 3,324,260
Patented June 6, 1967

3,324,260
SWITCHED OUTLET ADAPTER
Walter C. Schumacher, Warwick, R.I., assignor to General Electric Company, a corporation of New York
Filed Oct. 1, 1965, Ser. No. 492,160
6 Claims. (Cl. 200—51)

This invention relates to electric circuit breakers and, more particularly, to electrical switched outlet adaptors for electrical convenience outlets utilized in residential, commercial and industrial areas.

In the operation of electrical appliances either in the home or commercial areas, it is desirable to have easy access to an on-off control for such appliances. Some appliances are equipped with suitable on-off control switches which allow the operator to control the appliance without unplugging the electrical plug receptacle from an electrical convenience outlet. In many instances, however, electrical appliances can only be de-energized by manually removing the associated plug receptacle from its convenience outlet. Further, in the case of operating several appliances simultaneously from a common outlet, it is likely some or all of the appliances may not have the appropriate switch, thus necessitating removal of the plug receptacles from the common outlet to de-energize certain appliances. This method of control for electrical appliances has proved to be awkward and time-consuming. This invention, therefore, serves to obviate such methods and provides a quick, sure, safe method for controlling the operation of such appliances.

Accordingly, one of the objects of this invention is to provide an outlet adaptor having a novel switching means which will provide rapid, responsive on-off control for electrical appliances used with the adaptor of this invention.

A further object of this invention is to provide an electrical switched outlet adaptor which can be used with both single and duplex electrical convenience outlets as a simple removable attachment device or as a permanent fixture.

Another object of this invention is to provide an adaptor housing for accommodating two single switched outlet adaptors according to this invention as a single duplex adaptor unit for an electrical convenience duplex outlet.

Yet a further object of this invention is to provide an adaptor housing as above-described which is provided with a break-off portion to allow for immediate use of the duplex switched outlet adaptor as two single units.

It is still a further object of this invention to provide an electrical switched outlet adaptor which is efficient and reliable in operation and yet with the other parts of the switch adaptor may be economically manufactured and easily assembled into a light-weight, compact structure that will experience prolonged service.

According to one embodiment utilizing the principles of this invention, there is provided a switched outlet adaptor having a hollow housing provided with a pair of slots for receiving the terminal prongs of an electrical plug receptacle. A pair of terminal blade members extend from the housing for engagement with an electrical convenience outlet. Each of the blade members comprises an internal stationary contact portion adjacent each slot in the housing, one of the contact portions being adapted to receive the blade of a terminal prong. A toggle switch mechanism is provided in the housing for operating a movable contact which coacts with the other stationary contact portion forming a part of one of the terminal blade members.

Other objects and advantages will become apparent from the following description taken in conjunction with the accompanying drawings in which—

FIG. 4 is an exploded view of another embodiment of an adaptor employing the principle of this invention;

FIG. 5 is a cutaway view and plan of the adaptor shown in FIG. 4;

FIG. 6 is a cross-sectional view taken along line 6—6 in FIG. 5;

FIG. 7 is a plan view of yet another embodiment of an adaptor employing the principle of this invention;

FIG. 8 is a side elevational view of the adaptor shown in FIG. 7 and

FIG. 9 is a cross-sectional view taken along line 9—9 in FIG. 8.

Figure 1:
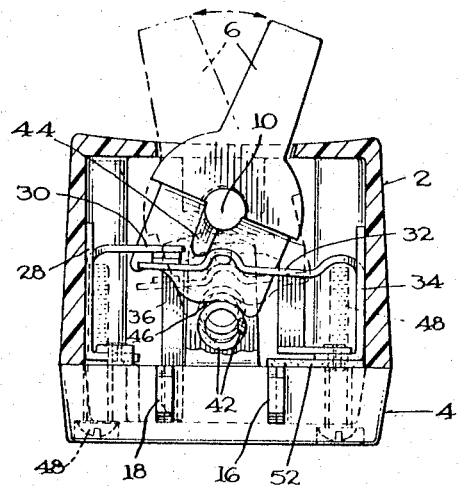
FIG. 1 is a perspective view of the switch adaptor embodying the principles of this invention.
Figure 3:
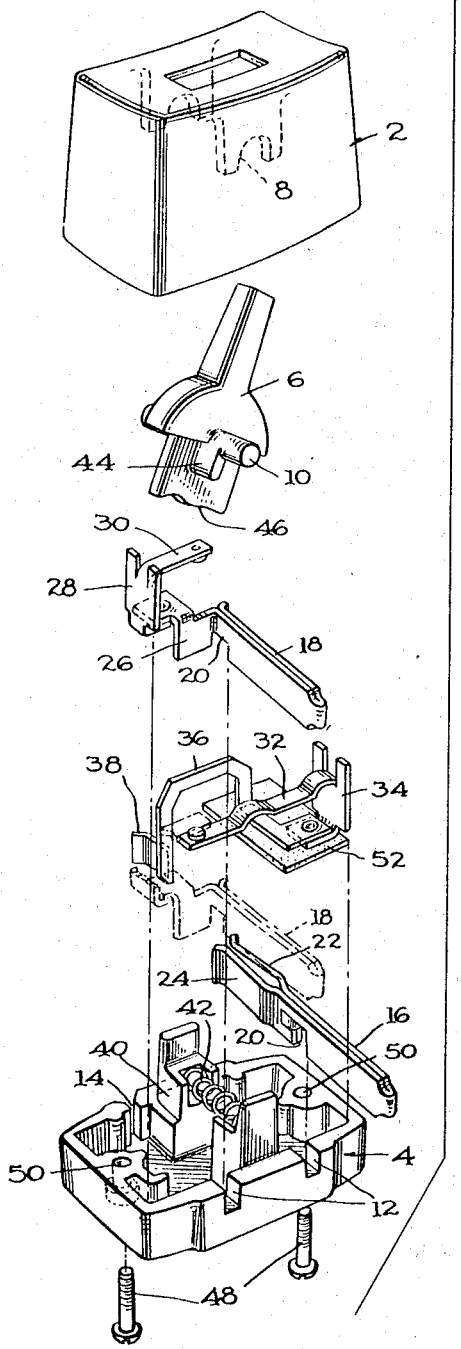
FIG. 3 is an exploded view of the switch adaptor shown in FIG. 2.
Figure 2:
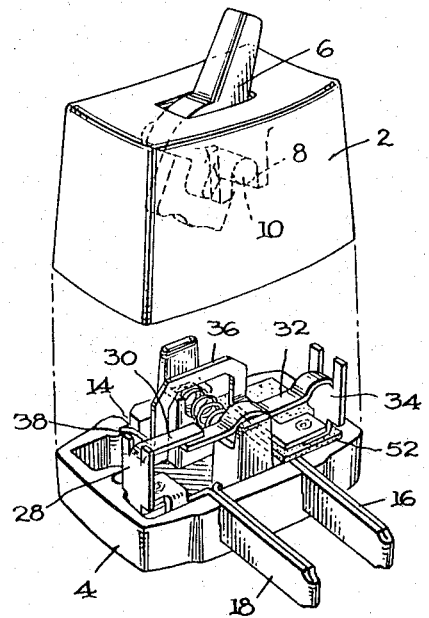
FIG. 2 is a partially exploded view of the switch adaptor shown in FIG. 1.

Referring now to the drawings, and more particularly to FIGS. 1 through 3, there is shown a hollow switch housing 2 comprising a recessed base 4 molded of suitable insulating material. A switch handle trigger 6, also formed as a molded part and the operation of which will be explained later, is pivotally mounted in open bearings 8 in the opposite side walls of the housing 2 by means of trunnions 10 extending transversely of the trigger. Provided in the recessed base 4 on opposite side walls thereof are a pair of parallel slots 12, 14. The space between the slots of each pair defines the distance corresponding to the distance between the terminal prong receiving slots in a conventional electrical convenience outlet. Each of the slots 14 positions a terminal blade contact member 16 and 18 both provided with a slot 20 adapted to cooperate with the slots 12 to thereby provide a locking engagement between the terminal members and the base 4. As shown in FIG. 3, terminal member 16 comprises a strip of conductive metal bent to include coextensive legs which form a blade section of the terminal member and punched at its mid-section to form the slot 20. The free ends of the coextensive legs are then bent slightly outwardly so as to form a "through" connection having spacedly related contact gripping fingers 22, 24 for one of the prongs in an electrical plug receptacle associated with an appropriate electrical appliance. The other terminal member 18 is similarly composed of a conductive strip metal bent to include coextensive legs and having a slot or notched area 20 formed in the mid-section thereof in the same manner as member 16. Adjacent the slot 20 the strip metal is bent at right angles to the long axis of the terminal blade to provide a right angle support 26 for a generally U-shaped contact member 28. The bottom leg of the U-shaped member 28 is riveted, as by suitable means, to the support 26 thus leaving the upper leg 30 free to operate as a relatively stationary contact. To complete the terminal blade member structure 18, a movable contact 32 similarly shaped to the fixed contact 30 is formed of resilient strip material and forms an extended upper leg of a U-shaped member 34 which is counterpart to U-shaped member 28. Both members 28 and 34 are each received in respective slots (not shown) provided on the opposite side walls of the housing 2 during the assembly of the adaptor. Riveted to the bottom leg of U-shaped member 34 is another generally U-shaped member 36 formed of strip resilient material which forms a terminal contact leg 38 adjacent one of the slots 14. The leg 38 operates in the same manner as legs 22, 24 to contact an appropriate prong member in an electrical plug receptacle for a suitable appliance.

Provided in the recessed base 4 on opposite side walls thereof and between the slots 12 and 14 respectively are bearing members 40 for receiving the respective ends of a coil spring 42. The suspended or middle portion of the coil spring engages the lower cam surface of the trigger 6 and provides a snap action toggle movement thereto in a manner described and claimed in the patent to George B. Benander et al., issued Jan. 24, 1961 and assigned to the same assignee as this application. It will suffice to continue, however, with a brief explanation of the trigger operation. The trigger 6 is designed to pivot on its trunnions 10, as above described, between two extreme positions as shown in dotted line in FIG. 1. A small cam 44 extends downwardly below one of the trunnions 10 for engagement with the raised middle portion of the movable contact 32. In the position of the trigger 6 shown in FIG. 1 the cam 44 is to the left of the raised middle portion thereby allowing the movable contact 32 to bias upwardly against the stationary contact 30. In the dotted line position of the trigger 6, the cam 44 is on top of the raised portion thereby holding the movable contact 32 away from the fixed contact 30 so that the circuit is open through the switch assembly. The bottom of the trigger 46 formed of a thin plate-like extension consists of a two-position cam with appropriate spring pockets that are separated by a downwardly extending central point or tip. When the trigger 6 is in either of its two extreme positions, one of the spring pockets on the cam surface 46 accommodates the coil spring with little or no deflection, however, when the trigger is moved toward its opposite position, the central tip portion separating the spring pockets on cam surface 46 will depress the central portion of the spring. The central portion is dimensioned such that the trigger 6 is unstable in its central position so that it will slip off the spring into either one of its extreme positions. Once the trigger 6 is off center, the inherent resiliency in the spring will tend to pivot the trigger into a predetermined position depending upon the curvature of one of the spring pockets on the cam surface 46.

When assembled, the housing 2 and the base 4 are secured together by screws 48 extending in holes 50 provided both in the base 4 and the housing 2 as best shown in FIGS. 1 and 3. Further, a flat plate like insulating member 52 composed of a suitable fibrous material is riveted to the underside of the lower leg of the U-shaped contact member 34 for electrically separating the contact member from the underlying terminal blade member 16.

In FIG. 4 there is shown a modification of this invention wherein a duplex switched outlet adaptor is provided to be permanently secured to a conventional convenience duplex outlet. In this particular embodiment, the duplex adaptor comprises two terminal members whereby one is inserted in the lower outlet of a duplex outlet and the other in the opposite position in the upper outlet of the same duplex outlet. Specifically, as shown in FIGS. 4–6, a hollow switch housing 54 is provided with two pairs of terminal prong receiving slots 66, 72 and a base portion 56 molded of suitable insulating material. The same toggle action switch as used with the single outlet adaptor shown in FIGS. 1–3 is provided in the upper portion of the housing 54. Where like parts exist in the duplex outlet adaptor as those used in the single outlet adaptor, the same numerals with affixed primes will be applied. Turning again to FIG. 4, the stationary and movable contacts 30' and 32', are shown as extensions of their respective support members 28', 34' which are received in their respective slots 58' on opposing side walls of the upper housing 54. Bearing surfaces 40' are provided on the base portion 56 for supporting a coil spring 42' at its respective ends. The trigger 6' extending into the interior of the housing is provided with a cam surface 46' having a movable contact operating cam 44' as above described with respect to FIGS. 1–3. Riveted to the bottom leg of U-shaped support member 28' is a terminal blade member 60 extending through an appropriate slot in the base 56. To the bottom leg of U-shaped support member 34' is pivoted a generally L-shaped extension member 62 corresponding to member 36 in FIG. 3. Integral therewith and extending upwardly from the long leg portion of member 62, are two terminal prong gripping members 64 as best shown in FIG. 4. Each of the members 64 is formed by bending together legs 64a, 64b when coplanar with member 62. Each of the gripping members 64 lies adjacent to an aperture 66 provided on top of the housing 54. Opposed to the etxension member 62, there is provided another strip member 68 formed of an electrically conductive sheet material and having appropriate legs 70a, 70b integral therewith which when biased together form terminal gripping members 70 similar to members 64 on extension leg 62. The gripping members 70 are then in a position adjacent apertures 72 in the top of the housing 54. Strip 68 is further provided with a terminal blade 74 riveted by suitable means to the bottom thereof and extending out through an appropriate slot in the base portion 56. The housing 54 and its associated base portion 56 are secured together by suitable screws 76 adapted to fit in holes 78 occupying the corner portions of the housing 54. The housing 54 is further provided with a recess hole 80 provided at the center thereof for receiving a screw 82 normally used for securing a wall plate to the convenience duplex outlet.

FIGS. 7–9 illustrate another embodiment of this invention wherein a central adaptor housing is provided for accommodating two single switched outlet adaptors 2 for use with an electrical convenience duplex outlet. As shown in FIG. 7, a generally square-shaped adaptor member 84 molded of suitable insulating material is provided with screw receiving holes 86 on opposite faces thereof for receiving screws 88 extending from each single switched adaptor. Each of the adaptors in this embodiment is provided with recesses 90 on opposing faces for receiving the appropriate screw. Once the switched adaptors are secured to the opposite faces of the central adaptor member, they form a duplex adaptor unit having separate manual trigger switch members for independently operating either one of the single outlets in the conventional duplex outlet. Both of the trigger handles 6 are shown to be downwardly extended to their off positions. To accomplish this arrangement it is necessary that one of the outlet adaptors will have its parts in reversed relation with respect to the other, that is, one of the adaptors will be the mirror image of the other. The central adaptor member may be provided with a spring clip means (not shown) on its opposing faces for receiving the single adaptor unit 2 on each face. This last embodiment avoids the necessity of providing screw holes on the single adaptor units. Utilizing two independently switched adaptors in this manner is best suited for the split circuit wiring normally associated with home utility areas.

As best shown in FIG. 9, the central adaptor 84 is provided with a recess 92 in its central portion for receiving the conventional wall plate screw for a convenience duplex outlet.

Although several embodiments of the invention have been depicted and described, it will be apparent that these embodiments are illustrative in nature and that a number of modifications in the apparatus and variations in its end use may be effected without departing from the spirit or scope of the invention as defined in the appended claims.

That which is claimed is:

1. A switched outlet adapter comprising a hollow insulating housing, a pair of power accepting blades extending from said housing to accept electric power into said adapter, a lever operated switch, the lever handle of which extends through said housing for operation in a plane generally normal to the longitudinal axes of said extending power blades, a pair of slots in said housing spaced to admit power blades to said housing for transfer of electric power controlled by said switch from said adapter, blade receiving electrical contacts in said housing aligned with said pair of slots for contact with power blades inserted into said housing, one of said blade receiving contacts electrically linked directly to the metal of one of said extending power blades, the other contact connectable through said lever operated switch to the other extending power blade.

2. The adapter of claim 1 wherein the longitudinal axes of the extending power blades and inserted power blades are parallel.

3. The adapter of claim 2 wherein the overall thickness of the device in the direction of extent of its power blades is less than double the length of said power blades.

4. The adapter of claim 1 wherein the lever is the trigger of a toggle switch.

5. The adapter of claim 1 wherein the slots in said housing are in pairs disposed to admit like pairs of power blades to pairs of electrical contacts, and wherein one contact of each pair is directly electrically linked with one extending power blade, and the other contact of each pair is connectable through said switch with the other extending power blade.

6. The adapter of claim 1 wherein the extending blades and the inserted blades are linearly aligned.

References Cited
UNITED STATES PATENTS

| | | | |
|---|---|---|---|
| 2,474,454 | 6/1949 | Avery | 200—51 |
| 3,123,686 | 3/1964 | Leichsenring | 200—51 |

ROBERT K. SCHAEFER, *Primary Examiner.*

R. S. MACON, *Examiner.*

H. O. JONES, *Assistant Examiner.*